(12) United States Patent
Horst (10) Patent No.: US 11,599,620 B2
(45) Date of Patent: Mar. 7, 2023

(54) SECURING ACCESS TO GROUP ACCOUNTS ON A COMPUTER SYSTEM

(71) Applicant: XANESTI TECHNOLOGY SERVICES, LLC, San Diego, CA (US)

(72) Inventor: John Horst, San Diego, CA (US)

(73) Assignee: XANESTI TECHNOLOGY SERVICES, LLC, San Diego, CA (US)

(*) Notice: Subject to any disclaimer, the term of this patent is extended or adjusted under 35 U.S.C. 154(b) by 312 days.

(21) Appl. No.: 16/738,980

(22) Filed: Jan. 9, 2020

(65) Prior Publication Data

US 2020/0226241 A1  Jul. 16, 2020

Related U.S. Application Data

(60) Provisional application No. 62/791,575, filed on Jan. 11, 2019.

(51) Int. Cl.
*G06F 21/40* (2013.01)
*G06F 21/33* (2013.01)
(Continued)

(52) U.S. Cl.
CPC ............. *G06F 21/40* (2013.01); *G06F 21/33* (2013.01); *G06F 21/34* (2013.01); *G06F 21/50* (2013.01); *G06Q 20/3572* (2013.01)

(58) Field of Classification Search
CPC .......... G06F 21/40; G06F 21/33; G06F 21/34; G06F 21/50; G06Q 20/3572
See application file for complete search history.

(56) References Cited

U.S. PATENT DOCUMENTS

| 2009/0198618 A1* | 8/2009 | Chan ................... G06F 21/445 707/E17.014 |
| 2012/0011573 A1* | 1/2012 | Menasce ............... G06F 21/40 726/4 |
| 2012/0233681 A1* | 9/2012 | Adams ................. G06F 1/1656 726/7 |

FOREIGN PATENT DOCUMENTS

| EP | 1787214 A2 | 5/2007 |
| EP | 1836639 A2 | 9/2007 |

OTHER PUBLICATIONS

Anonymous: "Common Access Card—Wikipedia," Nov. 5, 2018; p. 1, Paragraph 1; p. 4, Paragraph 4. Retrieved from the Internet: https://en.wikipedia.org/w/index.php?title=Common_Access_Card&oldid=867415665 [retrieved on Mar. 23, 2020].

(Continued)

*Primary Examiner* — Amie C. Lin
(74) *Attorney, Agent, or Firm* — Knobbe, Martens, Olson & Bear, LLP (57) ABSTRACT

A system, method, and computer program to implement Public Key Infrastructure ("PKI")-based access controls on a computing device independently of the operating system's user identification and authorization system. A software application on a standalone, non-networked computing device detects a "smart card" with a PKI certificate identifying the card holder. The identity of the card holder is verified against a registry stored on the computing device separately from the operating system's user identification and authorization system. Verification of the identity of the card holder results in setting the state of the computer system as "authorized" or "unauthorized." In the unauthorized state, user input and viewing of information is prevented. The software application may thus identify individual smart card holders and provide secure access to data and resources, and (Continued)

track authorized and unauthorized access on computing devices that must remain in an "always logged in" state.

20 Claims, 5 Drawing Sheets

(51) Int. Cl.
*G06F 21/34* (2013.01)
*G06F 21/50* (2013.01)
*G06Q 20/34* (2012.01)

(56) References Cited

OTHER PUBLICATIONS

International Search Report and Written Opinion for International Application No. PCT/US2020/012971 dated Mar. 30, 2020, in 17 pages.

* cited by examiner

SECURING ACCESS TO GROUP ACCOUNTS ON A COMPUTER SYSTEM

CROSS-REFERENCE TO RELATED APPLICATION

This application claims the benefit of U.S. Provisional Application No. 62/791,575, entitled SECURING ACCESS TO GROUP ACCOUNTS ON A COMPUTER SYSTEM and filed Jan. 11, 2019, the entirety of which is hereby incorporated by reference herein.

BACKGROUND

Computer operating systems generally identify persons by associating them with an account identified by a username. The relationship between an account and a person is typically one-to-one. An account may enable a person to access, for example, an account-specific directory, a common directory (i.e., one accessible by multiple accounts), network domains, and other resources. Verifying that a person is associated with an account is usually accomplished by the operating system prompting the person to enter their username and a "shared secret," such as a password for their account known only to the person. The operating system will also usually include one or more "groups" to which an individual user can belong. The operating system may include a file system that grants or denies various privileges (e.g., read or write access to files) based on membership of a user in one or more of groups.

An alternate method for identifying a user of a computer is known as Public Key Infrastructure ("PKI"). PKI includes the creation of digital certificates for identifying a user, digitally signing electronic documents, encrypting data at rest (e.g., on disc) or in transit (e.g., when sent via email), and otherwise securing access to data or resources. Digital certificates may be encoded onto a chip on a card, which is commonly known as a "smart card." The smart card may also include other information, such as a picture or name of a person, a barcode, or other data printed on the card, or a personal identification number ("PIN") or other data encoded on a magnetic strip. In some embodiments, the smart card typically serves both as a physical identification card or badge and a digital identification card suitable for use with a computer system.

Operating systems may support associating a digital certificate from the smart card to a person's account on the computer system. This "two factor authentication" approach is preferred for systems requiring heightened security: The user both possesses the card itself (what one "has") and knows the PIN encoded on the card (what one "knows"). This has the effect of both replacing complex passwords and avoiding regular changing of the password. Because verification of the shared secret (the PIN) requires physical possession of the card, the PIN may remain unchanged, alleviating the user from changing the account password and otherwise having to remember multiple long and complex passwords.

The use of PKI with digital certificates on smart cards may require that each certificate be associated with a separate user account. Upon removing the card from a reader attached to the computer system, the operating system either "locks" the system, or logs the present user out. If a separate person inserts their card in that system, that person is logged into the computer separately. The operation of applications under the former user is thus unknown to the latter user and vice-versa.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to securing access to computer systems. More specifically, aspects of the present disclosure are directed to systems, methods, and computer-readable media related to identifying and authorizing users of a system where operating system user logins must be shared among multiple persons. For example, a common instance in which account-level PKI cannot be used to identify and authorize users is a computer system operating in a "kiosk" mode, such as a touchscreen order entry system in a fast food restaurant. These computing systems often feature a standard operating system, such as Microsoft Windows®, configured to operate in a kiosk mode. Such a computer system typically has a "user account" under which the kiosk application runs, but this user account does not correspond to a single person. Among computer security professionals this is sometimes referred to as a "group account." Since the purpose of having user accounts is to ultimately control what can be done on the system, in kiosk mode a computer will be configured to allow the operation of only the kiosk application.

Another example of an instance in which account-level PKI cannot be used to identify individual users is for military computer systems deployed in the field. This use case will be referred to herein as the "tactical" use case. With the "kiosk" use case, the customer approaching the terminal is automatically considered authorized to use the terminal to place an order. As such, there is no need to otherwise identify the user. The application will be running under the context of a "group" account that an employee will have used to start and run the terminal. The "tactical" use case addresses a situation where a computing system must be run in an always-on mode similar to the "kiosk" use case, and thus executes an application or applications in the context of a similar "group" account. However, due to the heightened security requirements germane to the nature of the system, it is considered necessary to otherwise identify and authorize persons who would use the system. This necessity arises from regulatory requirements imposed on military information systems which are intended to control for the risks of unauthorized use and repudiation of actions taken by a person when using the system.

Tactical computing environments of the United States military and its coalition partners are governed by regulations requiring the implementation of a certain subset of standards published by the U.S. National Institute of Standards and Technology (NIST) presented as Special Publication 800-53, and under other similar standards for coalition partners. Under these standards, a computer system is categorized as presenting Low, Moderate, or High risks. U.S. Department of Defense systems are automatically considered Moderate at minimum, and will be ranked High based on the sensitivity of the use being made of the system. Among the security controls articulated by NIST 800-53, systems rated Moderate or High are expected to implement Control IA-5 with the IA-5(2) Enhancement, which says in part "The information system, for PKI-based authentication maps the authenticated identity to the account of the individual or group . . . ."

Systems are also required to implement logging requirements such as that stated in NIST 800-53 Control AU-3: "The information system generates audit records containing information that establishes what type of event occurred, when the event occurred, where the event occurred, the source of the event, the outcome of the event, and the identity of any individuals or subjects associated with the event." Because the "tactical" use case requires a single operating system "group account" with multiple persons knowing the username and password, standard operating system logs cannot discriminate among the persons authorized to use the system under such a group account. Further, for systems rated High, NIST 800-53 specifies AU-10, requiring "the information system protects against an individual (or process acting on behalf of an individual) falsely denying having performed actions in the system." Industry uses the term "non-repudiation" to describe this control.

The use of a PKI with digital certificates on smart cards may require that each certificate be associated with a separate user account. Upon removing the card, the operating system either "locks" the system, or logs the present user out. If a separate person inserts their card in that system, a separate instance of the operating system runs under that new person's context. The operation of applications under the former user is unknown to the latter user and vice-versa. This is clearly not a workable implementation when a "tactical" system must remain on and available 24/7/365 in the same operating system security context (for example a "group" account.) As such, the above requirements are impossible to meet as stated under the state of the art. Authorization of systems thus becomes dependent on subjective assessments as to what other means are employed to ensure only properly authorized persons are making use of the "group account;" that these persons are identified by way of the U.S. DoD's Public Key Infrastructure; and that the use made by a person of the system is logged in such a way as to deny the person the ability to repudiate actions taken in the system. These other means can be many and varied, some being more reliable than others.

The present disclosure addresses these problems by offering a single, standard method and process and the necessary computer software to orchestrate this method and process, to allow a U.S. Department of Defense or coalition partner command to implement the applicable standards as intended and continue to operate successfully with the requirements of the "tactical" use case.

In various embodiments, a software application may secure access to other applications ("tactical applications") that are executing on a shared account by displaying the banner or other elements in a manner that prevents a user from viewing all or part of the tactical application's user interface, intercepting or disabling user input to the tactical application (for example, disabling or redirecting input devices, preventing the tactical application from obtaining "focus" and receiving input, etc.), or otherwise preventing the unauthorized user from providing input or receiving output. The software application may further provide logging information (for example, timestamps of the transitions between "authorized" and "unauthorized" states, the users whose smart cards were used to enter the "authorized" state, etc.), which is be combined or integrated with operating system logs to provide a more complete view of authorized user activity or unauthorized attempts to access the system.

It will be understood that the embodiments described herein addresses a technical problem that specifically arises in the realm of computer networks, and in particular addresses a problem that arises in the realm of securing access to computer systems executing an application from a single account utilized by multiple users. It will further be understood that the technical problem described herein is not analogous to any pre-Internet practice, and that the embodiments described herein improve the performance of the computer system by enabling secure access in such scenarios.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing the embodiments of the disclosure herein described.

Figure 1:
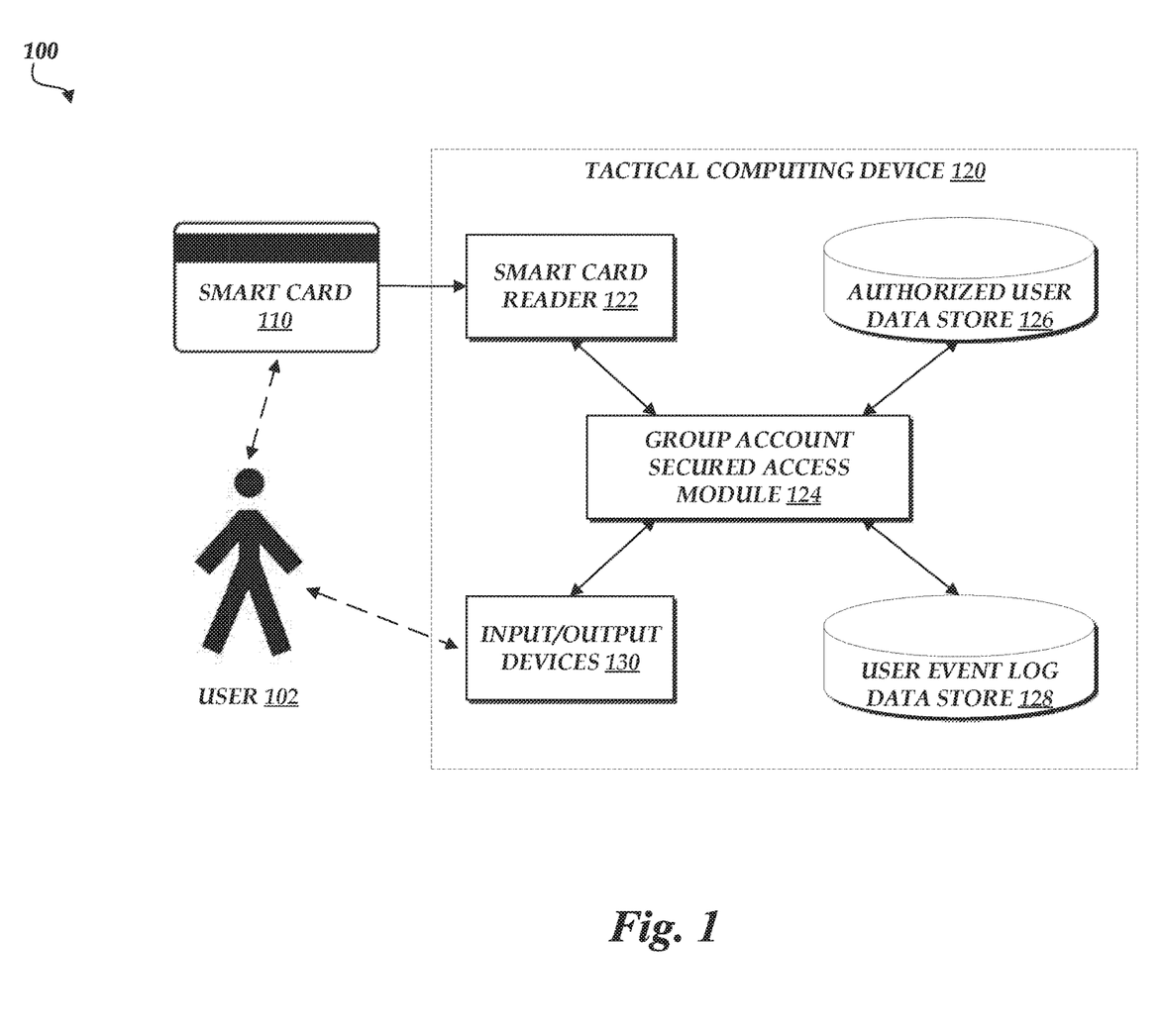
FIG. 1 is a block diagram depicting an illustrative operating environment in which a group account secured access system prevents unauthorized access to tactical applications executing from a group account in accordance with aspects of the present disclosure.

FIG. 1 is a block diagram of an illustrative operating environment 100 in which a user 102 with a smart card 110 interacts with a tactical computing device 120 in accordance with aspects of the present disclosure. It will be understood that the operating environment 100 may include more (or fewer) elements than those shown in FIG. 1. It is not necessary, however, that all of these elements be shown in order to provide an enabling disclosure.

In the illustrated operating environment 100, the user 102 may insert or swipe a smart card 110 into a smart card reader 122, which is in communication with a tactical computing device 120. In the illustrated embodiment, the smart card reader 122 is a component of the tactical computing device 120. In other embodiments, the smart card reader 122 may be a component of a separate device in communication with the tactical computing device 120. In various embodiments, the smart card 110 may be any authentication device that stores a digital certificate, including but not limited to a magnetic-stripe card, chip card, key fob, Universal Serial Bus ("USB") device, near-field communication ("NFC") device, hardware dongle, or other security device. Similarly, the smart card reader 122 may be any computing device that interfaces with the smart card 110 to obtain the stored digital certificate.

The tactical computing device 120 is described in more detail below with reference to FIG. 4, and may generally be any computing device that executes a tactical application from a shared or group account as described above. In the illustrated embodiments, the tactical computing device includes the smart card reader 122, a group account secured access module 124, an authorized user data store 126, a user event log data store 128, and input/output devices 130, which in some embodiments may display user interfaces to the user 102 and receive input from the user 102. The group account secured access module 124 may, in various embodiments, be any combination of computer hardware and software that implements aspects of the present disclosure.

The authorized user data store 126 and the user event log data store 128 may generally be any non-transitory computer-readable data stores, including but not limited to hard drives, magnetic media, solid state devices, flash memory, EEPROMs, or other media. In some embodiments, the authorized user data store 126 and the user event log data store 128 may be implemented as databases, web servers, or other services, and may be accessed through an application programming interface ("API"). Additionally, in some embodiments, the authorized user data store 126 and the user event log data store 128 may be external to the tactical computing device 120, and may communicate with the tactical computing device 120 via a network interface. In various embodiments, the authorized user data store 126 and the user event log data store 128 may be implemented as a single data store, distributed across multiple data stores, or implemented on a cloud computing service.

The input devices 130 may generally include any devices and/or interfaces that enable user interaction with the tactical computing device 120, including but not limited to pointing devices, keyboards, joysticks, display screens, touchscreens, microphones, cameras, speakers, accelerometers, biometric scanners, speech synthesis modules, voice recognition modules, haptic feedback modules, motion sensors, and the like. In some embodiments, the smart card reader 122 may be an input/output device 130 or may be a component of an input/output device.

In some embodiments, the operating environment may further include a network (not depicted in FIG. 1). The network may illustratively be any wired or wireless network, or combination thereof. In addition, the network may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or some other type of wireless network. The network may use protocols and components for communicating via the Internet or any of the other aforementioned types of networks.

Figure 2A:
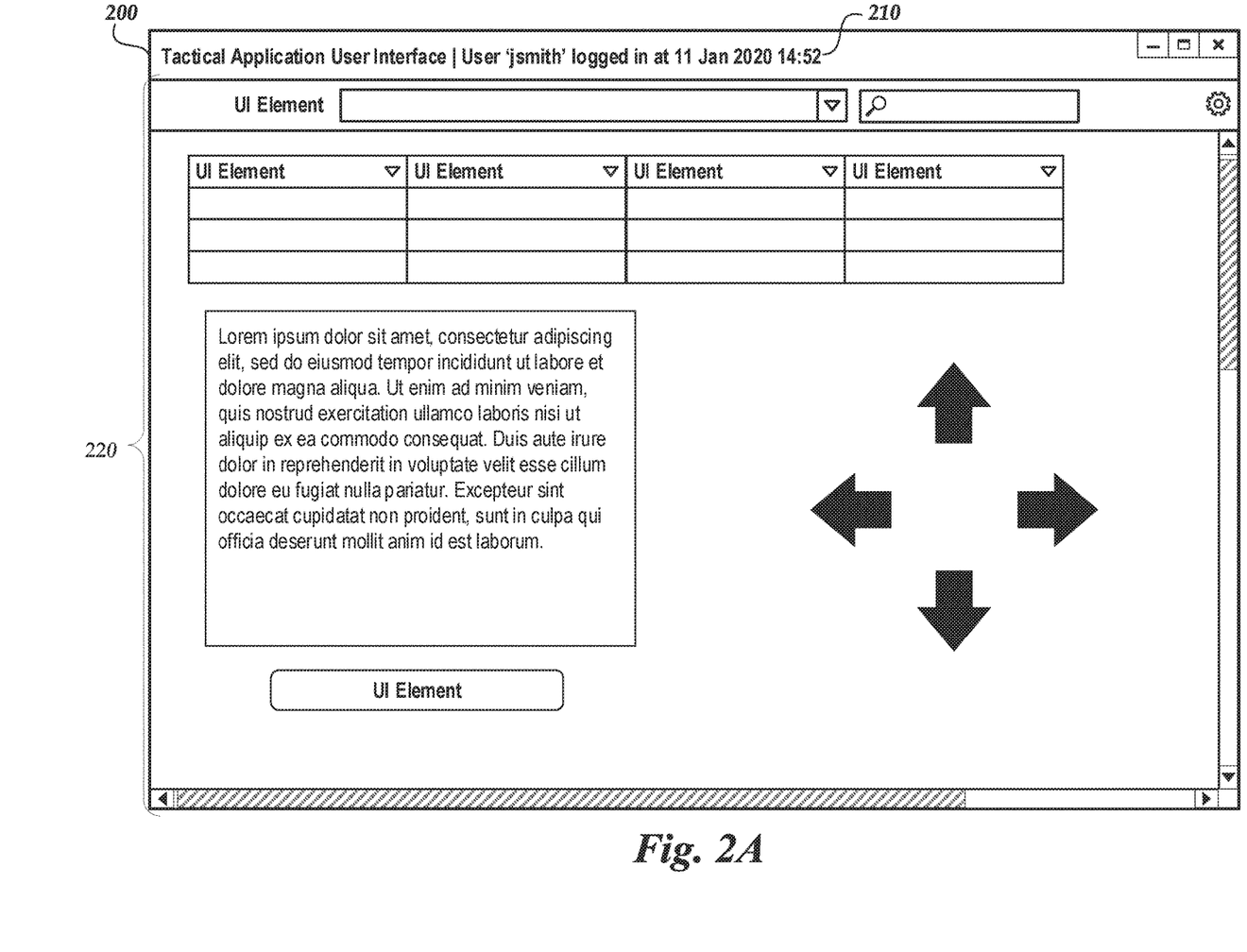
FIGS. 2A and 2B are drawings of example user interfaces for enabling and preventing access to tactical applications executing from a group account in accordance with aspects of the present disclosure.
Figure 2B:
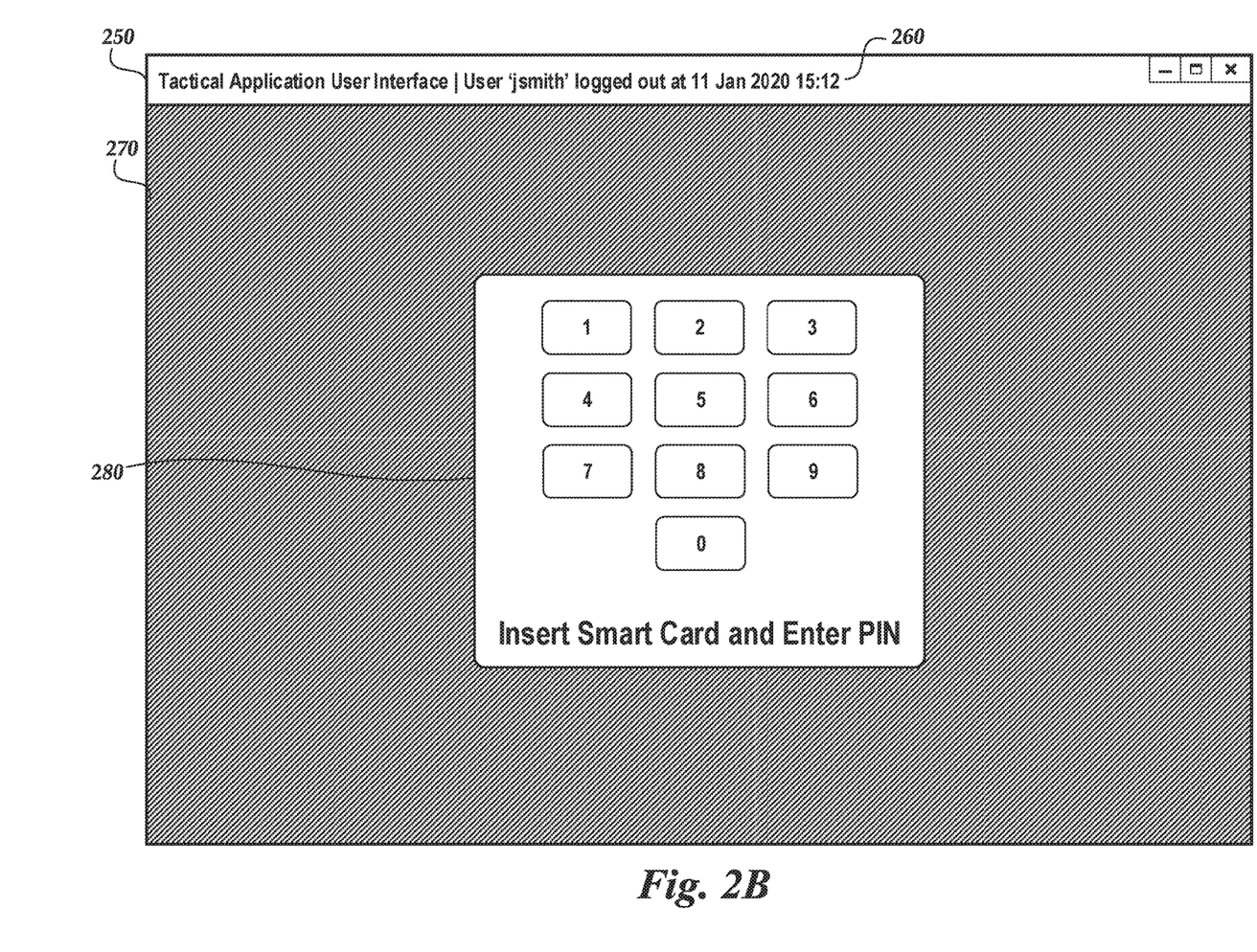

FIGS. 2A and 2B are illustrative diagrams of user interfaces 200 and 250 that may be displayed in accordance with aspects of the present disclosure. The user interfaces 200 and 250 may be displayed, for example, by the tactical computing device 120 depicted in FIG. 1, and may be generated by the group account secured access module 124 and/or the user interface module 424 depicted in FIG. 4 below. With reference now to FIG. 2A, the user interface 200 is an example of a user interface presented by a tactical application that executes on a group account, such as the tactical application 426 depicted in FIG. 4. The example user interface 200 includes an authorized user indicator 210, which indicates that a session with the authorized user 'j smith' began at a particular time. In some embodiments, the authorized user indicator 210 may display other information, such as the duration of the current session, logged events, or other information regarding the authorized user. The user interface 250 further includes a number of controls 220 for interacting with the tactical application, which may vary from one tactical application to the next or may vary during execution of the tactical application.

Illustratively, the user interface 200 may be displayed only when an authorized user has presented a smart card and entered a PIN, thereby limiting access to the tactical application to authorized users only. If an authorized user has not presented valid credentials, or after the authorized user has ended a session (for example, by removing a smart card from a smart card reader), the user interface 250 depicted in FIG. 2B may instead be displayed. The user interface 250 includes an overlay 270, which in some embodiments overlays the user interface 200 and prevents all or part of it from being viewed. The user interface 250 may further include an updated user indicator 260, which may indicate that a previous session with an authorized user ended at a particular time. In some embodiments, the user interface 250 and/or the overlay 270 may cover only part of the user interface 200, allowing elements such as the indicator 210 to remain in view and display updated information. In other embodiments, the overlay 270 may cover the entire display.

The user interface 250 may, in some embodiments, include a PIN input pad 280, which enables user input of a PIN or other user identifying information. In further embodiments, all or part of the PIN input pad 280 may only be displayed after the user inserts a smart card or otherwise presents a credential. In some embodiments, the user interface 250 may further indicate that an invalid PIN was entered or that an invalid credential was presented.

It will be understood that FIGS. 2A and 2B are presented for purposes of example, and that many variations on the user interfaces 200 and 250 are within the scope of the present application. For example, the user interface 200 may cover only a portion of a display (for example, the user interface 200 may be presented in a window), and the user interface 250 may cover only that portion of the display. As a further example, the user interface 200 may present an explicit "end session" or "log out" control that enables an authorized user to end a session without necessarily removing the smart card or other credential. FIGS. 2A and 2B are thus understood to be illustrative and not limiting.

Figure 3:
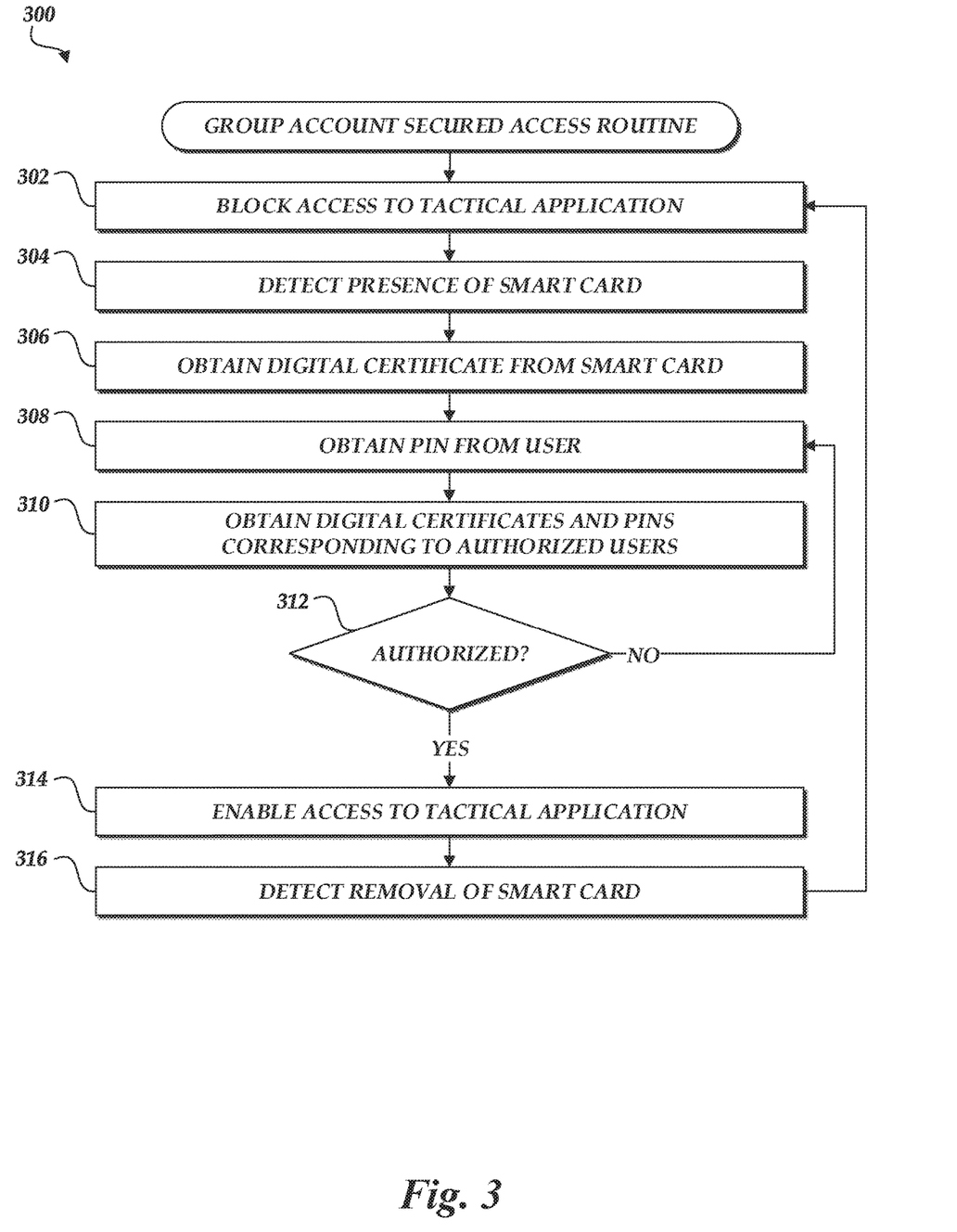
FIG. 3 is a flowchart depicting an illustrative routine for managing access to applications running on a shared account in accordance with aspects of the present disclosure.

FIG. 3 is a flow chart depicting an illustrative routine 300 for secured access by individual users to a tactical application on a group account. The routine 300 may be carried out, for example, by the group account secured access module 124 depicted in FIG. 1. The routine 300 begins at block 302, where insecure access to a tactical application executing on a group account may be prevented. Illustratively, the routine 300 may prevent access by presenting a user interface that overlays the interface of the tactical application, such as the user interface 250 depicted in FIG. 2B. In some embodiments, the routine 300 may prevent user input (for example, keyboard input, touchscreen gestures, mouse movements, etc.) from being processed by the tactical application, or may prevent output generated by the tactical application (for example, audio output or haptic feedback) from being delivered by various output devices.

At block 304, the presence of a smart card or other authentication device may be detected. Illustratively, the routine 300 may detect that a smart card has been inserted or "tapped" on a smart card reader, or may detect, for example, an RFID tag, Bluetooth beacon, or other indicator that an authentication device is being presented. At block 306, a digital certificate or other identifier may be obtained from the smart card.

At block 308, a PIN, password, biometric data (for example, a fingerprint or face scan), or other proof of identity may be obtained from a user associated with the smart card. In some embodiments, the routine 300 may cause display of a separate user interface for collecting the PIN. In other embodiments, the user interface for collecting the PIN may be the same user interface presented at block 302 (for example, the user interface 250). At block 310, digital certificates and PINs corresponding to authorized users may be obtained. In some embodiments, digital certificates and PINs may be obtained by querying a database of authorized users for credentials that match the digital certificate and PIN obtained at blocks 306 and 308. In other embodiments, a hash or key may be generated based on the obtained digital certificate and PIN, and the generated hash or key may be compared to the credentials of authorized users.

At decision block 312, a determination may be made as to whether the obtained digital certificate and PIN correspond to an authorized user. If not, then the routine 300, in some embodiments, may branch to block 308 and re-prompt the user to enter a correct PIN. In further embodiments, the routine 300 may "lock out" a digital certificate and/or smart card after a specified number of incorrect PINs have been entered, and may log attempts to use the smart card with an invalid PIN. If the determination at decision block 312 is that the obtained digital certificate and PIN correspond to an authorized user, then at block 314 access to the tactical application may be enabled. Illustratively, access to the tactical application may be enabled by removing the user interface that overlays the tactical application interface, by allowing data from input devices to be delivered to the tactical application, by allowing output from the tactical application to be transmitted to output devices, and so forth. In some embodiments, validation of the authorized user and any events or interactions with the tactical application may be logged to a log file in a manner that identifies the authorized user. Additionally, in some embodiments, all or part of the user interface displayed to enable access to the tactical application may identify the authorized user.

At block 316, removal of the smart card or other authentication device may be detected. The routine 300 may therefore end the current session with the authorized user. For example, the routine 300 may branch to block 302 and restore the measures taken to prevent unauthorized access to the tactical application. In some embodiments, the end of the session with the authorized user may be logged.

It will be understood that FIG. 3 is provided for purposes of example, and that many variations on the routine 300 are within the scope of the present disclosure. For example, blocks 306 and 308 may be carried out in either order or in parallel. As a further example, access to the tactical application may be blocked prior to execution of the routine 300, and the routine 300 may re-block unauthorized access after the authorized user ends a session. The depicted routine 300 is thus understood to be illustrative and not limiting.

Figure 4:
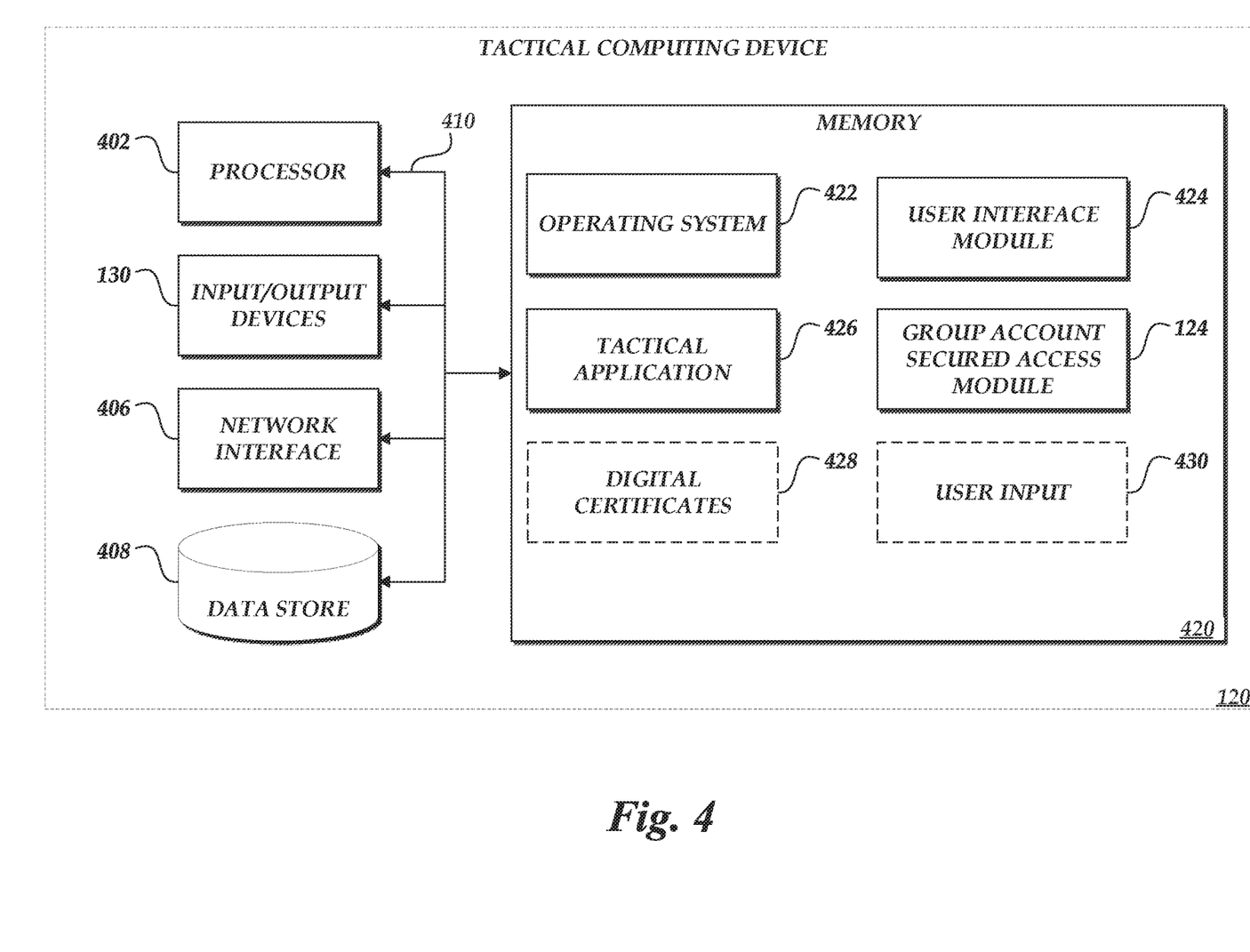
FIG. 4 depicts a general architecture of a computing device implementing a group account secured access system in accordance with aspects of the present disclosure.

FIG. 4 depicts a general architecture of a tactical computing device 120 that includes an arrangement of computer hardware and software configured to implement aspects of the present disclosure. The tactical computing device 120 may include many more (or fewer) elements than those shown in FIG. 4. It is not necessary, however, that all of these elements be shown in order to provide an enabling disclosure.

As illustrated, the tactical computing device 120 includes a processor 402, input/output devices 130, a network interface 406, and a data store 408, all of which may communicate with one another by way of a communication bus 410. The network interface 406 may provide connectivity to one or more networks or computing systems and, as a result, may enable the tactical computing device 120 to receive and send information and instructions from and to other computing systems or services. In some embodiments, the tactical computing device 120 may be configured to process requests from other devices or modules, such as requests to initiate network communications. The data store 408 may illustratively be any non-transitory computer-readable data store, and in some embodiments may include all or part of the authorized user data store 126 and the user event log data store 128 depicted in FIG. 1.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the tactical computing device 120. The memory 420 may further store specific computer-executable instructions and other information (which may be referred to herein as "modules" or "engines") for implementing aspects of the present disclosure. For example, the memory 420 may include a user interface module 424, a tactical application 426, and group account secured access module 124, which may implement aspects of the present disclosure as described above. The memory 420 may further include digital certificates 428 and user input 430, which may be loaded into the memory 420 as various operations are performed.

While the operating system 422, user interface module 424, tactical application 426, and group account secured access module 124 are illustrated as distinct modules in the memory 420, in some embodiments, the user interface module 424, tactical application 426, and group account secured access module 124 may be incorporated as a module or modules in the operating system 422 or another application or module, and as such, separate modules may not be required to implement some embodiments.

It will be recognized that many of the components described in FIG. 4 are optional and that embodiments of the tactical computing device 120 may or may not combine components. Furthermore, components need not be distinct or discrete. Components may also be reorganized. For example, the tactical computing device 120 may be represented in a single physical device or, alternatively, may be split into multiple physical devices. In some embodiments, components illustrated as part of the tactical computing device 120 may additionally or alternatively be included in other computing devices, such that some aspects of the present disclosure may be performed by the tactical computing device 120 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computing system, comprising:
   a data store configured to store computer-executable instructions; and
   a hardware processor in communication with the data store, wherein the computer-executable instructions, when executed by the hardware processor, configure the hardware processor to perform operations including:
   causing display of a first user interface, the first user interface preventing access to a tactical application associated with a shared account on the computing system, wherein the shared account has been logged into on the computing system, and wherein the shared account is associated with a plurality of authorized users;
   obtaining, from a smart card reader, a digital certificate stored on a smart card;
   causing display of a second user interface, the second user interface enabling user input of a personal identification number ("PIN");
   receiving, via the second user interface, the PIN;
   determining that the digital certificate and the PIN correspond to a first authorized user of the plurality of authorized users associated with the shared account; and
   causing display of a third user interface, the third user interface enabling access to the tactical application by the first authorized user.

2. The system of claim 1, wherein the operations further include storing information regarding the first authorized user in an access log.

3. The system of claim 1, wherein the data store is further configured to store information regarding authorized users of the tactical application.

4. The system of claim 3, wherein determining that the digital certificate and the PIN correspond to the first authorized user comprises verifying that the digital certificate and the PIN correspond to the information stored in the data store.

5. The system of claim 1, wherein the operations further include causing redisplay of the first user interface in response to a determination that the smart card has been removed from the smart card reader.

6. The system of claim 1, wherein the third user interface is generated by the tactical application, and wherein the first user interface prevents access to the tactical application by blocking the third user interface from view.

7. The system of claim 1, wherein the operations further include preventing user input from being received by the tactical application while the first user interface is displayed.

8. The system of claim 1, wherein the third user interface includes information identifying the first authorized user.

9. A computer-implemented method, comprising:
obtaining, from a smart card reader, a first digital certificate stored on a first smart card;
obtaining, via a first user interface, a first PIN;
verifying that the first digital certificate and the first PIN correspond to a first authorized user of a plurality of authorized users of a tactical application on a tactical computing system, wherein a shared account associated with the plurality of authorized users has been logged into on the tactical computing system; and
displaying a second user interface that enables the first authorized user to access the tactical application.

10. The computer-implemented method of claim 9 further comprising:
determining that the first smart card has been removed from the smart card reader; and
displaying a third user interface, wherein the third user interface prevents access to the tactical application.

11. The computer-implemented method of claim 10, wherein the third user interface comprises an overlay that prevents the second user interface from being viewed.

12. The computer-implemented method of claim 9 further comprising:
obtaining, from the smart card reader, a second digital certificate stored on a second smart card;
obtaining, via the first user interface, a second PIN;
determining that at least one of the second digital certificate or the second PIN does not correspond to any authorized user of the plurality of authorized users of the tactical application; and
displaying a third user interface, wherein the third user interface prevents access to the tactical application.

13. The computer-implemented method of claim 9 further comprising enabling user input to the tactical application via one or more input devices.

14. The computer-implemented method of claim 9, wherein verifying that the first digital certificate and the first PIN correspond to the first authorized user comprises verifying that the first digital certificate and the first PIN are included in a data store containing authorized user information.

15. The computer-implemented method of claim 9 further comprising storing, in a data store, that the first authorized user accessed the tactical application.

16. The computer-implemented method of claim 9, wherein the tactical computing system is categorized as presenting a low risk, moderate risk, or high risk under NIST Special Publication 800-53.

17. A non-transitory computer-readable medium storing computer-executable instructions that, when executed by a processor, configure the processor to perform operations including:
determining that a first storage device is in communication with the processor;
determining, based at least in part on a digital certificate stored on the first storage device and information received from a first user, that the first user is authorized to access a tactical application associated with a shared account on a tactical computing system, wherein the shared account is associated with a plurality of authorized users, and wherein the shared account has been logged into on the tactical computing system;
causing display of a first user interface that enables access to the tactical application;
determining that the first storage device is no longer in communication with the processor; and
in response to determining that the first storage device is no longer in communication with the processor, causing the first user interface to no longer be displayed.

18. The non-transitory computer-readable medium of claim 17, wherein causing the first user interface to no longer be displayed comprises displaying a second user interface.

19. The non-transitory computer-readable medium of claim 17, wherein the first storage device is a smart card.

20. The non-transitory computer-readable medium of claim 17, wherein the information received from the first user comprises one or more of a PIN, password, or biometric data.

* * * * *